United States Patent
Reyes et al.

(10) Patent No.: US 6,707,688 B2
(45) Date of Patent: Mar. 16, 2004

(54) ELECTRIC APPARATUS WITH ELECTRIC TERMINALS AND FUSED STRUCTURES

(75) Inventors: Jeremiah G. Reyes, Santa Barbara, CA (US); Richard W. Sevier, Goleta, CA (US); James J. Keenan, Santa Barbara, CA (US); Jerry C. Rawlins, Santa Maria, CA (US); Paul E. Andreasen, Lompoc, CA (US); Richard J. Bowers, San Ramon, CA (US)

(73) Assignee: Hendry Mechanical Works, Goleta, CA (US)

( * ) Notice: Subject to any disclaimer, the term of this patent is extended or adjusted under 35 U.S.C. 154(b) by 0 days.

(21) Appl. No.: 09/769,935

(22) Filed: Jan. 25, 2001

(65) Prior Publication Data

US 2002/0046858 A1 Apr. 25, 2002

Related U.S. Application Data

(60) Provisional application No. 60/178,587, filed on Jan. 28, 2000.

(51) Int. Cl.[7] .................................................. H01R 9/00
(52) U.S. Cl. ....................................... 361/824; 361/833
(58) Field of Search ................................. 361/825–835; 337/206, 262, 167, 189; 40/312, 654.01; 81/3–8; 340/638

(56) References Cited

U.S. PATENT DOCUMENTS

| | | | | |
|---|---|---|---|---|
| 3,518,783 A | * | 7/1970 | Foley | 40/336 |
| 3,824,520 A | * | 7/1974 | Knapp, Jr. | 337/161 |
| 4,128,024 A | * | 12/1978 | Hyams et al. | 81/3.8 |
| 4,284,296 A | * | 8/1981 | Evans | 40/654.01 |
| 4,661,807 A | * | 4/1987 | Panaro | 340/638 |
| 5,214,565 A | * | 5/1993 | Flores | 361/386 |
| 6,396,380 B1 | * | 5/2002 | Girke et al. | 337/189 |

* cited by examiner

Primary Examiner—Evan Pert
Assistant Examiner—Tuan Dinh
(74) Attorney, Agent, or Firm—Koppel, Jacobs, Patrick & Heybl

(57) ABSTRACT

Electric apparatus having distinct electric terminals has an input power terminal of electrically insulating material, including a base of electric insulating material having a first electric terminal base portion and a second electric base portion spaced from that first electric base portion, and a barrier wall of insulating material on that base acting as an isolator between the first and second electric terminals on these base portions, and preferably also as a standoff for a protective cover. A plurality of electric fuse holders in that or other electric apparatus may be mounted in mutually spaced relationship, and a heat sink including a frame around that plurality of mutually spaced electric fuse holders is in heat-transfer relationship with these electric fuse holders, and includes a cross-piece between each adjacent pair of the mutually spaced electric fuse holders. A flame-resistant designation card for that or other apparatus has a first data-bearing section, a second data-bearing section, a first folding crease between such first and second data-bearing sections, a shorter third section adjacent that second data-bearing section, and a second folding crease between the shorter third section and the second data-bearing section. Fuse condition designation flags are rendered better visible by service personnel and fuse rating designation pins are better organized. Ground wire terminals are safeguarded against rotation and loosening.

10 Claims, 6 Drawing Sheets

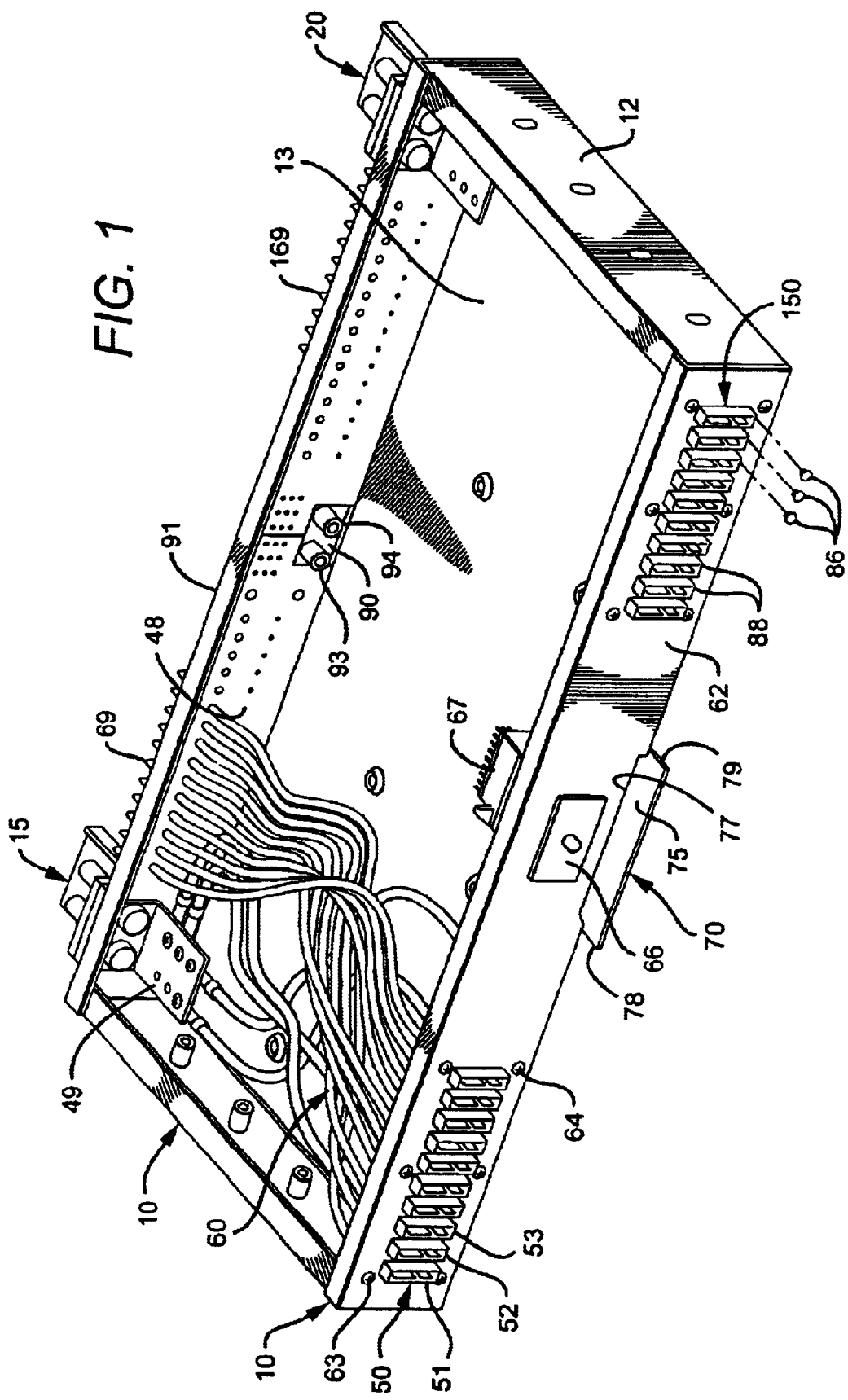

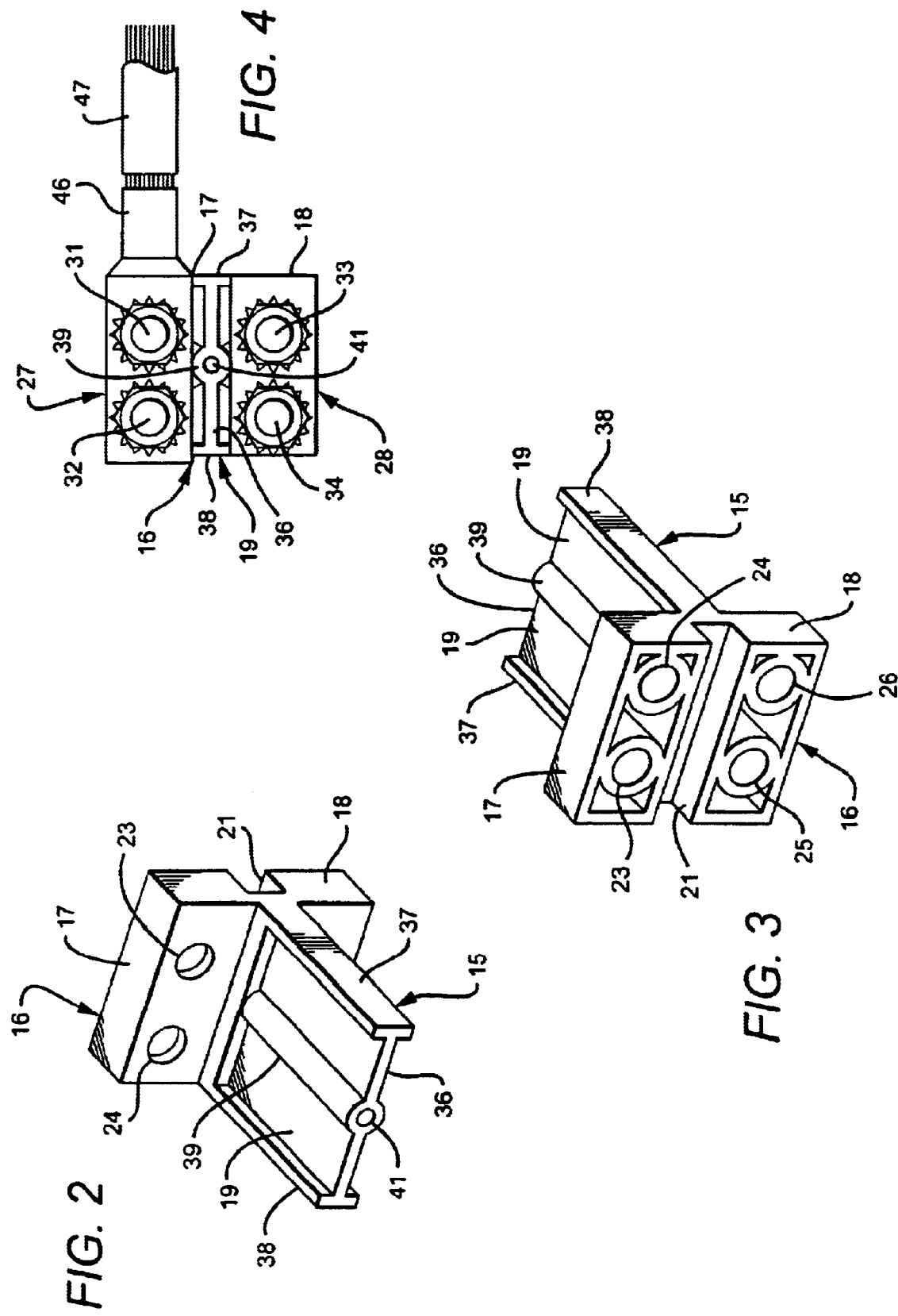

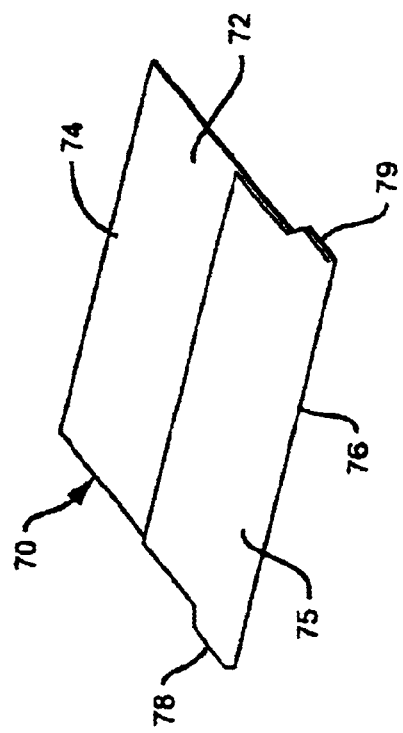
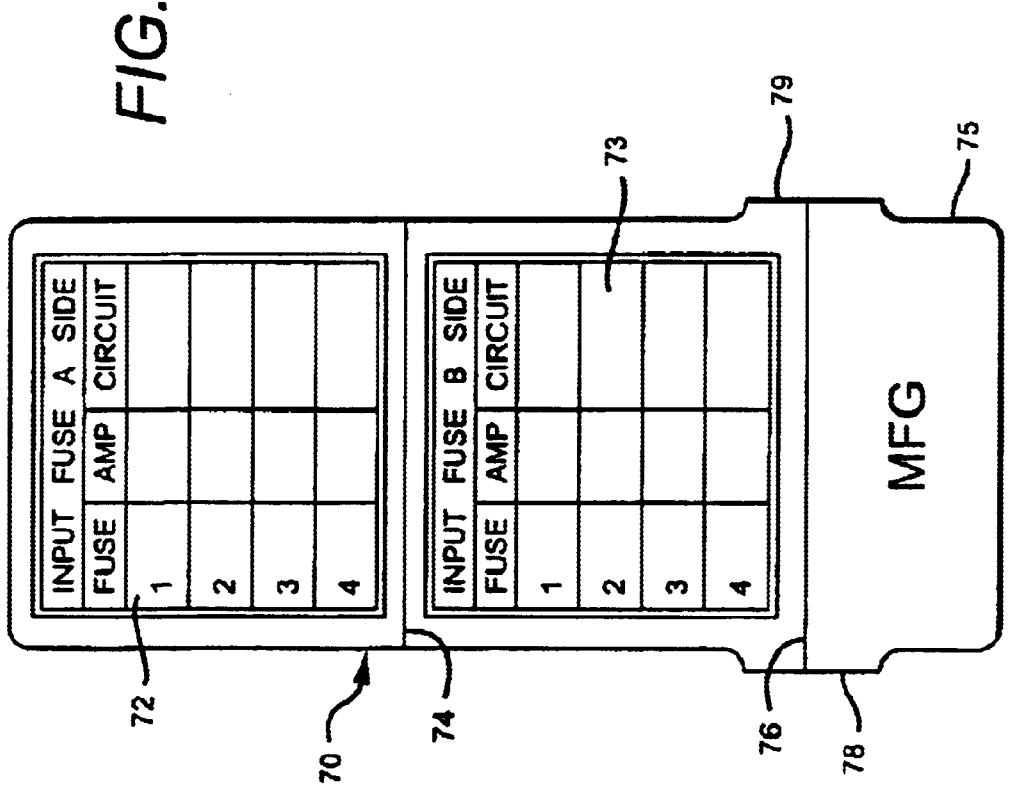

US 6,707,688 B2

ELECTRIC APPARATUS WITH ELECTRIC TERMINALS AND FUSED STRUCTURES

RELATED APPLICATION

This application claims the benefit of provisional patent application No. 60/178,587, filed Jan. 28, 2000.

FIELD OF THE INVENTION

The subject invention relates to electric apparatus and to electric terminal structures and fused structures, such as used in telephone exchanges or otherwise.

BACKGROUND

Despite a seeming abundance of electric terminal configurations, there has persisted a need for improved terminal structures possessing at least one or more of the following features:

- a stronger separation of opposite terminals,
- better accommodation of terminal elements and fasteners,
- cleaning facility between opposite terminals,
- standoff facility for terminal covers,
- strainless one-piece construction, and
- manufacturability by molding or extrusion at a balanced cooling pattern.

In a similar vein, prior-art arrays of fuse holders between such terminals and load circuits had limited capacity with vulnerability to overheating and impaired power rating.

Moreover, prior-art fuse circuit designation cards used in conjunction with fuse holders were stored in envelopes that were vulnerable to burning.

There also persisted a need for fused panels and other apparatus combining at least two of the following features:

- improved terminal structures of the above mentioned type,
- fuse holder arrays of increased capacity and power rating,
- thermally stable fuse circuit designation cards.

Moreover, existing electric fuse arrangements often make it difficult for maintenance and service personnel in telephone exchanges and similar installations to become aware when a fuse has blown. This is particularly true when fuses are mounted high above a floor, such as at a height of some six and more feet. By way of example, existing arrangements mount fuses having spring-biased fuse condition flagging devices so that such flagging devices point away from the floor toward the ceiling when the fuse blows, and thereby are difficult to see by maintenance and service personnel.

SUMMARY OF INVENTION

It is a general object of the invention to overcome the above mentioned disadvantages and to meet the above mentioned needs.

It is a germane object of the invention to provide improved electric terminal structures.

It is a related object of the invention to provide electric terminal structures with integral standoffs.

It is also an object of the invention to provide fuse holder arrays of increased capacity and power rating.

It is a related object of the invention to provide thermally stable fuse circuit designation pins and cards.

It is also an object of the invention to improve mounting of fuses so that their condition can more easily be discerned by maintenance and service personnel.

Other objects of the invention will appear in the further course of this disclosure.

The invention resides in an electric apparatus having distinct electric terminals, and more specifically resides in the improvement comprising, in combination, an input power terminal of electrically insulating material, including a base of electric insulating material having a first electric terminal base portion and a second electric base portion spaced from that first electric base portion, and a barrier wall of insulating material on that base between these first and second electric terminal base portions.

The invention resides also in electric apparatus comprising, in combination, a plurality of electric fuse holders mounted in mutually spaced relationship, and a heat sink including a frame around said plurality of mutually spaced electric fuse holders in heat-transfer relationship with these electric fuse holders, and a cross-piece between each adjacent pair of the mutually spaced electric fuse holders.

The invention resides further in a flame-resistant designation card, comprising, in combination, a first data-bearing section, a second data-bearing section, a first folding crease between such first and second data-bearing sections, a shorter third section adjacent said second data-bearing section, and a second folding crease between the shorter third section and the second data-bearing section.

The invention resides also in an electric apparatus, comprising, in combination, a housing having a slot, and a folded flame-resistant designation card partially inserted in that slot. By way of example, the flame-resistant designation card may have a first data-bearing section, a second data-bearing section, a first folding crease between such first and second data-bearing sections, a shorter third section adjacent the second data bearing section, and a second folding crease between the shorter third section and the second data-bearing section.

The invention resides also in an electric apparatus comprising, in combination, a housing having a slot, a plurality of electric fuse holders mounted in that housing, and a folded flame-resistant fuse rating designation card partially inserted in that slot.

The invention resides also in an electric apparatus having a panel, a plurality of electric fuse holders mounted in that panel, a like plurality of designation pins, one for each fuse holder, with each of these designation pins designating a power rating attributed to a corresponding one of these electric fuse holders, and a like plurality of apertures in the panel, one for each of the designation pins, respectively aligned with the electric fuse holders.

The invention resides also in an electric apparatus having a panel structure mounted above a floor, and more specifically resides in the improvement comprising, in combination, a plurality of electric fuse holders mounted in that panel structure, and a plurality of electric fuses, one in each of the plurality of electric fuse holders; substantially each of the electric fuses having a spring-biased fuse condition flagging device pointing toward the floor in a blown condition of that electric fuse.

The invention resides also in an electric apparatus having distinct electric terminals, and more specifically resides in the improvement comprising, in combination, a standoff at the electric terminals, a removable terminal cover on a top of that standoff, a terminal cover fastener on top of that standoff, and a keyhole slot for the fastener in the removable terminal cover.

The invention moreover resides in an electric apparatus having a panel structure, and more specifically resides in the improvement comprising, in combination, a pair of spaced ground terminals on that panel structure, and a ground wiring device having a lug with two apertures corresponding to that pair of spaced ground terminals and attached with that pair of spaced ground terminals through these two apertures to the panel structure.

BRIEF DESCRIPTION OF THE DRAWINGS

The subject invention and its various aspects and objects will become more readily apparent from the following detailed description of preferred embodiments thereof, illustrated by way of example in the accompanying drawings which also constitute a written description of the invention, wherein like reference numerals designate like or equivalent parts, and in which:

FIG. 1 is a perspective view of electric apparatus according to an embodiment of the invention;

FIG. 2 is a perspective frontal view of a power terminal core structure according to an embodiment of the invention which may be used in the apparatus of FIG. 1 or otherwise;

FIG. 3 is a perspective rear view of the power terminal core structure of FIG. 2;

FIG. 4 is a top view of the power terminal cores structure of FIG. 2 and 3 in assembly with electric terminal devices according to an embodiment of the invention;

FIG. 14 is a plan view of a flame-resistant designation card which may be used in the apparatus of FIG. 1 or otherwise; and FIG. 15 is a perspective view of the designation card of FIG. 14 in a folded condition, such as usable in the apparatus of FIG. 1 or otherwise.

MODES OF CARRYING OUT THE INVENTION

Figure 5:
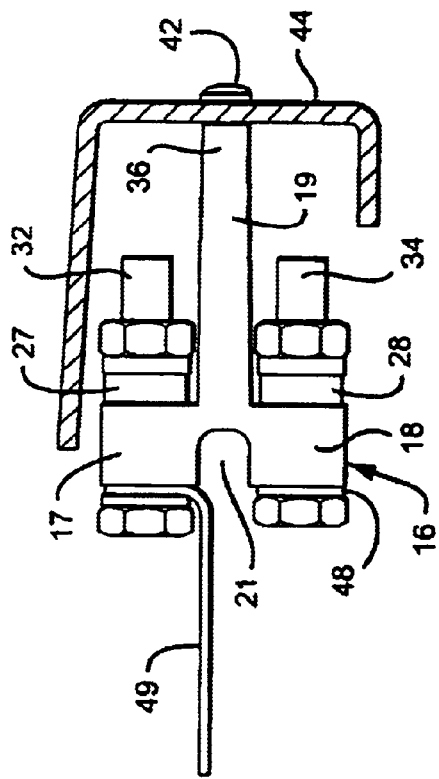
FIG. 5 is a bottom view of the assembled power terminal of FIG. 4.

The drawings show electric apparatus and components according to preferred embodiments of the invention.

By way of example, FIG. 1 shows electric apparatus 10 in the form of a cabinet 12 including a panel 13 and several components 15, 20, 50, 60 and 70 that may be used in any combination or independently of each other. Similar apparatus have been used for years as power distribution units (PDUs), also known as fuse panels, in telephone exchange equipment, but the invention is not so limited.

In this respect, FIGS. 1 to 7 show power terminal structures in the form of electric terminal devices with standoffs, including, for example, positive and negative terminals of a telephone or other direct-current system, or opposite terminals of an alternating current system, which may be used in the apparatus of FIG. 1 or in many other applications.

FIGS. 1 to 7 in particular show an integral input power terminal structure 15 of electrically insulating material according to an embodiment of the invention, including a base 16 of electric insulating material having a first electric terminal base portion 17 and a second electric terminal base portion 18 spaced from that first electric terminal base portion, and a barrier wall 19 of insulating material on that base between such first and second electric terminal base portions.

According to the illustrated embodiment of the invention, the base 16 has a groove 21 between the first and second electric terminal base portions 17 and 18 and opposite of the barrier wall 19. Such groove preferably is in parallel to the barrier wall 19.

According to an embodiment of the invention, the base 16 and barrier wall 19 are of one piece of electric insulating material, such as being produced in a molding or extrusion process of plastic materials. In such process, presence of the groove 21 balances the mass of material that needs to be cooled, thereby providing a better product free of internal strain.

In practice, presence of the groove 21 also complements the barrier wall 19 by enhancing separation of the terminal base portions 17 and 18 and thereby of the terminals 27 and 28 from each other for increased dielectric strength and insulation. Also, the groove 21 presents a channel for cleaning implements, such as streams of air, for flushing out any accumulation of debris, thereby avoiding dielectric breakdown between the oppositely polled terminals 27 and 28.

In the illustrated embodiment of the invention, the barrier wall 19 rises from a portion of the base 16 in between the first and second electric terminal base portions 17 and 18.

Also in the illustrated embodiment of the invention, the first and second electric terminal base portions 17 and 18 have spaced bores 23, 24, 25 and 26 about axes extending preferably in parallel to the barrier wall 19.

A first electric terminal 27 is on the first electric terminal base portion 17 at a first side of the barrier wall 19 and a separate second electric terminal 28 is on the second electric terminal base portion 18 at an opposite second side of that barrier wall, such as seen in FIGS. 4 and 5.

By way of example, a first bore 23 is in the first electric terminal base portion 17 at first side of the barrier wall 19 and a first electric terminal 27 is at that first side of that barrier wall, having a first fastener 31 in that first bore. Similarly, a second bore 25 is in the second electric terminal base portion 18 at an opposite second side of the barrier wall 19 and a second electric terminal 28 is at that opposite second side of the barrier wall having a second fastener 33 in that second bore.

According to the embodiment illustrated in FIGS. 4 and 5, a first pair of bores 23 and 24 is in the first electric terminal base portion 17 at first side of the barrier wall 19, a first electric terminal 27 is at that first side of the barrier wall, having a first pair of fasteners 31 and 32 in that first pair of bores. A second pair of bores 25 and 26 is in the second electric terminal base portion 18 at an opposite second side of the barrier wall 19, and a second electric terminal 28 at the opposite second side of the barrier wall, having a second pair of fasteners 33 and 34 in the second pair of bores 25 and 26.

Fasteners 31, 32, 33 and 34 may be conventional and may, for instance have the usual nuts-and-bolts arrangement with hexagonal nuts and hexagonal bolt heads, and with washers and tapped terminal plates, all collectively designated in sets as 31, 32, 33 and 34, respectively, to avoid overcrowding of the drawings with reference lines and reference numbers for conventional parts that are well know per se in the electrical terminal art and other fields. Alternatively, items 31 to 34 could be inserts which, for instance, may be pressed or molded into the material of the terminal base portions 17 and 18.

Figure 6:
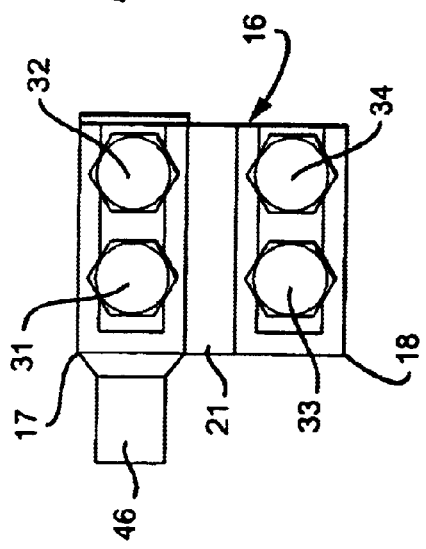
FIG. 6 is a view similar to FIG. 4 with a top view of a fraction of a transparent cover on the assembled power terminal according to an embodiment of the invention.
Figure 7:
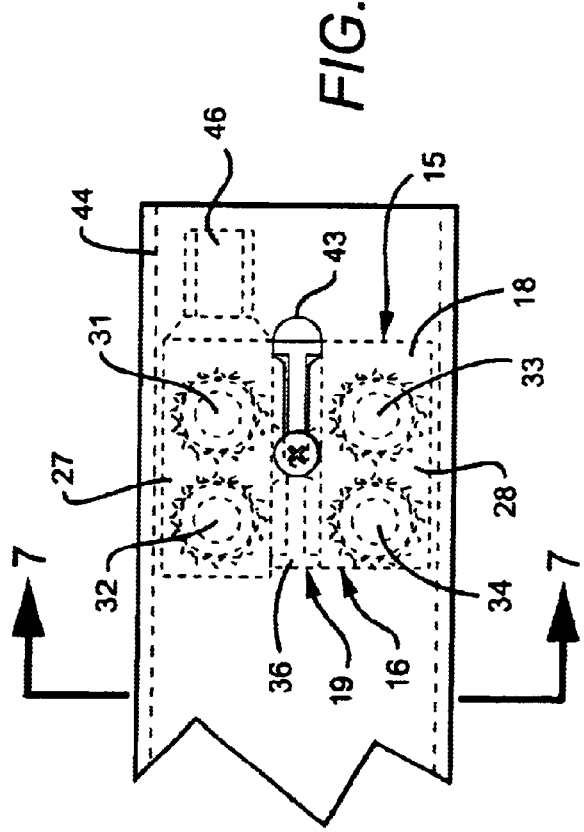
FIG. 7 is a side view, partially in section, taken on the line 7—7 in FIG. 6.

The barrier wall 19 has a top 36 opposite the base 16 and may have lateral reinforcements or ridges 37 and 38 extending, for instance, from the base 16 to that top 36. A similar reinforcement portion 39 may extend from the base 16 to the top 36, such as midway along the barrier wall 19 between reinforced edges 37 and 38, and may serve as a base for a fastener accommodation 41 on the top 36 of the barrier wall 19, being the top of the input power terminal 15 or 20. Such fastener accommodation may, for instance, include a tapped hole for receiving a screw or other fastener 42, such as seen in FIG. 7. A removable terminal cover 44, such as shown in FIGS. 6 and 7, may be mounted on the top 36 of the barrier wall 19 or input power terminal 15 or 20. Such terminal cover may be transparent so that the power terminal block or blocks 15 and 20 are visible through that cover, such as seen in FIG. 6. While that figure shows only a fraction of the terminal cover 44, such one-piece removable terminal cover 44 may extend across the apparatus shown in FIG. 1 from beyond the power terminal block 15 to beyond the power terminal block 20, being fastened to the top of each input power terminal 15 and 20 by fasteners, such as shown at 42 in FIG. 7.

In this or any other manner within the scope of the invention, each input power terminal 15 and 20 serve as a standoff for the removable cover 44 and also as a base and mutual separator of opposite electric terminals 27 and 28.

According to the embodiment seen in FIG. 6, there is at least one keyhole slot 43 in the removable cover 44. This aspect of the invention resides generally in an electric apparatus having distinct electric terminals, a standoff at electric terminals; a removable terminal cover such as 44 on a top of such standoff; a terminal cover fastener such 42 on top of such standoff; and a keyhole slot such as 43 for such fastener in the removable terminal cover. This way, the cover can be removed and replaced by losening and retightening the fastener 42 and sliding the cover axially without removal of such fastener.

By way of example, the first terminal 27 may include a wiring device or lug 46 attached to the base portion 17 by the nuts and bolts 31 and 32. A cable or other wiring 47 may be soldered or preferably crimped into a hollow terminal of the lug 46, such as shown in FIG. 4. The other terminal 28 may, of course, be similarly equipped.

In this or any other manner within the scope of the invention, electric power may be fed to the apparatus of FIG. 1 or to any other apparatus requiring positive and negative terminals 27 and 28 in a telephone or other direct-current system, or opposite terminals in an alternating current system.

Bus bars 48 and 49 may be connected to the terminals 27 and 28, respectively, to carry electric power into the apparatus, such as shown in FIG. 1 by way of example. Either bus bar may be bent or angled, such as shown for the bus bar 49 in FIGS. 1 and 7.

FIGS. 1, 8, 9 and 10 show an array or plurality 50 of mutually spaced electric fuse holders 51, 52, 53, etc., that may, for instance, be connected to one or both of the first and second electric terminals 15 and 20, such as via bus bars or wiring 60 indicated in FIG. 1.

Prior-art arrays of fuse holders had limited capacity which impaired their power rating. The problem has been diagnosed as vulnerability to overheating.

Accordingly, an embodiment of the invention provides the plurality 50 of mutually spaced electric fuse holders 51, 52, 53, etc., with a heat sink 55 including a frame 56 around that plurality of mutually spaced electric fuse holders in heat-transfer relationship with such electric fuse holders, and a cross-piece 57 between each adjacent pair of the mutually spaced electric fuse holders 51 and 52,52 and 53, etc.

In this respect, the heat sink 55 may have a ladder-like configuration, with rungs 57 of that ladder-like configuration interdigitated with electric fuse holders 51, 52, 53, etc. Part of a terminal board 58 shown in FIG. 9 has been broken away to show such heat sink configuration more clearly. Preferably, the rear portions of the fuse holders extend through openings in between those rungs of the heat sink 55, such as shown for the fuse holder 53 in FIGS. 9 and 10. This is also prefered for the fuse holders 51 and 52 shown in FIG. 9, but a showing of such fuse holders with rear portions has been omitted at the cut away portion of that FIG. 9 in order to provide a clearer view of the heat sink structure.

Suitable materials for the heat sink 55 include aluminum and similar heat-conductive materials.

The fuse holder assembly may include a terminal board 58 having the plurality of electric fuse holders 51, 52, 53, etc., mounted thereon in mutually spaced relationship apart from the heat sink 55.

Within the scope of the invention, the terminal board 58 may be similar to the bus bar 49 shown in FIGS. 1 and 7. By way of example, the terminal board 58 may be a common supporting structure for corresponding input and output terminals 65 and 59 of the fuse holders S1, 52, 53, etc., mounting such fuse holders in mutually spaced relationship. The terminal board may, however, have different configurations, such as terminal boards for individual connectors of individual terminals of the fuse holders 51, 52, 53, etc., such as the individual terminal 61 shown in FIG. 10 that may, for instance, be connected to individual bus bars or wires of a harness 60.

The heat sink under consideration may include a heat-conductive wall or paneling 62 of the cabinet 12, and heat-conductive fasteners 63 and 64 with which the heat sink 55 is connected to such paneling 62.

As a result of implementation of such embodiments of the invention, neighboring fuse holders will not affect each other by objectionable heat transfer between each other. Accordingly, each fuse holder can handle a greater capacity than if it were being affected by heat from one or two neighboring fuse holders. Conventional fuses can be used in the fuse holders 51, 52, 53, etc., such as conventional telephone circuit fuses that are plugged into such fuse holders, such as seen in FIGS. 11 and 12 at 81.

As is well-known in the art, such type of telephone circuit fuses release an alarm condition when blown, whereby it is possible to indicate an alarm condition when one or more circuits have become overloaded. As shown in FIG. 1 by way of example, a signal lamp 66 may be lit to indicate an alarm condition via alarm circuitry 67.

Figure 9:
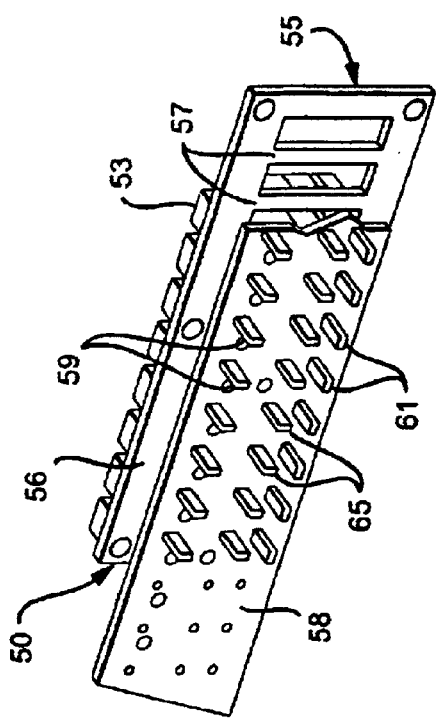
FIG. 9 is a perspective rear view partially broken away, of the assembly of FIG. 8.
Figure 10:
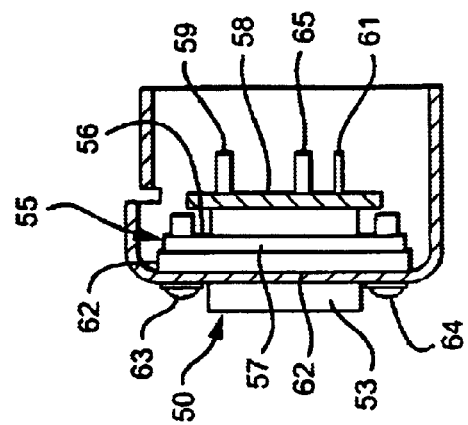
FIG. 10 is a section taken on the line 10—10 in FIG. 8 with added optional paneling.
Figure 8:
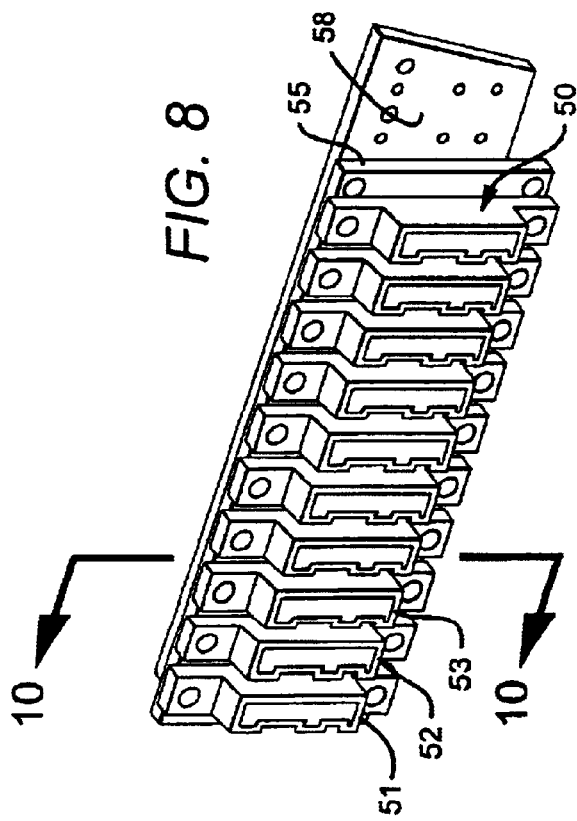
FIG. 8 is a perspective front view of an assembly of mutually spaced fuse holders according to an embodiment of the invention that may be used in the apparatus of FIG. 1 or otherwise.

The apparatus or panel structure shown in FIG. 1 or the plurality of electric fuse holders shown in FIGS. 1, 8 and 9, for instance, may be mounted above a floor; such as the floor 83 on which racks 84 stand. By way of example, such floor 83 may be the floor of a room in a telephone exchange or other installation on which racks or other mounting structures 84 for apparatus of the type shown in FIG. 1 or for other equipment including electric fuse holders are located. This is, of course, well known in the art, so that such arrangement is shown only schematically in FIG. 12.

Figure 12:
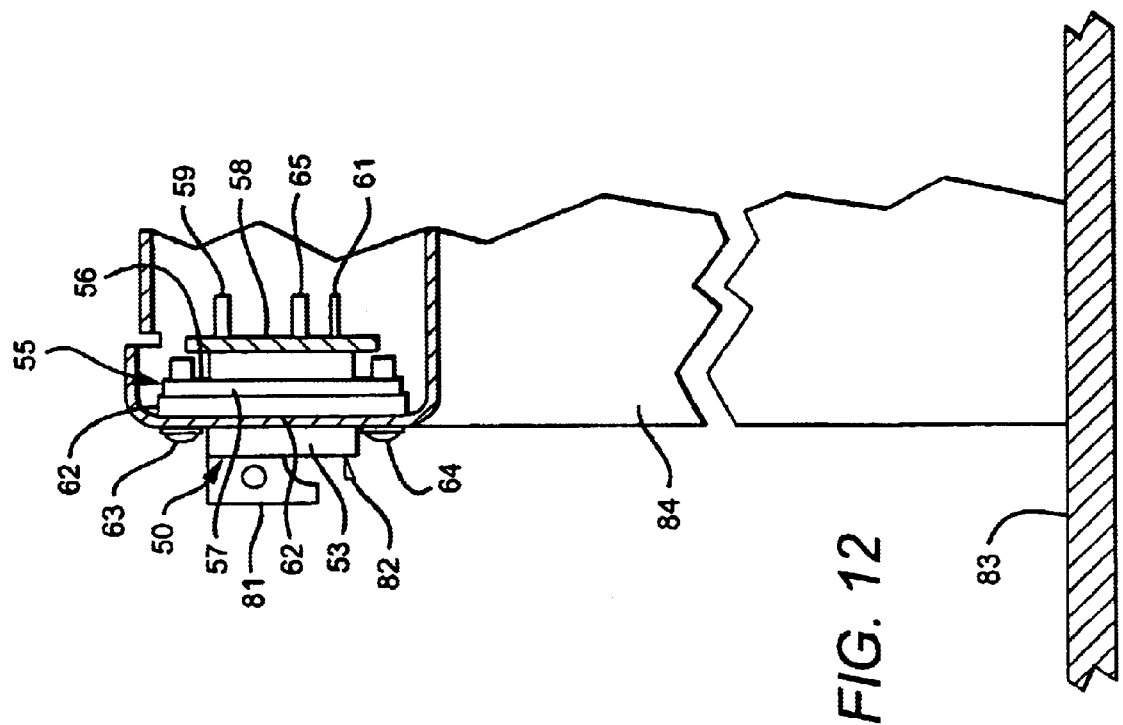
FIG. 12 is a view similar to FIG. 11 showing the fuse in a blown condition.
Figure 11:
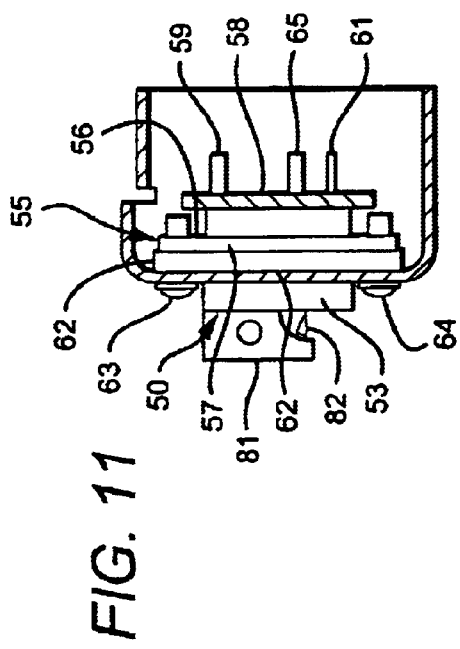
FIG. 11 is a view similar to FIG. 10 but showing a fuse holder with fuse mounted according to an embodiment of the invention.

FIGS. 11 and 12 may be seen as side views of the plurality of electric fuse holders seen in FIGS. 1, and 8 to 10 as mounted in a panel structure 62 and as connected to at least one of the above mentioned first and second electric terminals; such as by the wire harness 60 seen in FIG. 1. While the same fuse 81 is seen in FIGS. 11 and 12, that showing in side view is symbolic of a plurality of electric fuses, one in each of the above mentioned plurality of electric fuse holders.

Such fuses may be of the above mentioned conventional type whereby each of the electric fuses 81 has a spring-biased fuse condition flagging device 82 pointing toward the floor 83 n a blown condition of that electric fuse, such as shown in FIG. 12. Conversely, as seen in FIG. 11, each of these flagging devices 82 points away from the floor when the electric fuses are intact. This is just the opposite of prior-art electric fuse arrangements where fuses came to be mounted so that flagging devices 82 pointed away from the floor 83 when the fuse was blown, and where the body of the fuse obstructed the view of such flagging device, especially when the fuse holders where mounted high above the floor, which often made it difficult for maintenance and service personnel in telephone exchanges and similar installations to become aware when a fuse had blown and to take the required remedial action. The embodiment of the invention shown by way of example with the aid of FIGS. 11 and 12 elegantly and economically avoids such prior-art drawback by inverting the orientation of the fuse holder and thereby of the fuse so that the flagging devices 82 are no longer obstructed by the body of the fuse 81 for viewers working below such fuse holder array.

Another safety issue concerns the use of designation pins of the kind that designate amperages or power ratings for which fused circuits have been designed. By way of example, a well-known technology uses a color-coding scheme to designate the power rating of fuses and designation pins to mark such power rating on the corresponding fuse holders. An example of this is seen in FIG. 1 showing three designation pins 86 for tree of the fuse holders in the array 150. In practice, the head of a first one of these designation pins would be colored with a first color to designate a first power rating, such as ten amperes, for a first circuit connected to a corresponding first one of the fuse holders, and the corresponding first or ten-ampere fuse (e.g. 81, FIGS. 11 and 12) would then also be colored with that first color. Accordingly, when a fuse blows, such as seen in FIG. 12, the technician will be aided by the color-coding scheme under consideration to put only a ten-ampere fuse into that fuse holder as a replacement of the blown fuse, such as in FIG. 11.

Pursuant to such a scheme, the head of a second one of these designation pins would be colored with a second color to designate a second power rating, such as fifteen amperes, for a second circuit connected to a corresponding second one of the fuse holders, and the corresponding second or fifteen-ampere fuse would then also be colored with that second color. Similarly, the head of a third one of these designation pins would be colored with a third color to designate a third power rating, such as twelve amperes, for a third circuit connected to a corresponding third one of the fuse holders, and the corresponding third or twelve-ampere fuse would then also be colored with that third color, and so forth for all fuse holders in each array.

Accordingly, when fuses blow, such as seen in FIG. 12 for one of the fuses, the technician will always insert the correctly rated fresh fuse in each fuse holder for optimum protection and operability of any of the fused circuits. The embodiment of the invention illustrated in FIG. 1 considerably aids such endeavor by providing a plurality of apertures 88 in the panel 62.

In particular, that embodiment of the invention comprises a plurality of designation pins 86, one for each fuse holder, with each of these designation pins designating a power rating attributed to a corresponding one of the electric fuse holders, and a like plurality of apertures 88 in the housing or panel, one for each of these designation pins, respectively aligned with such electric fuse holders. Desired designation pins are thus received in the correct apertures for the proper designation of fuse holder and fuse for each of the circuits served by the apparatus 10.

Figure 13:
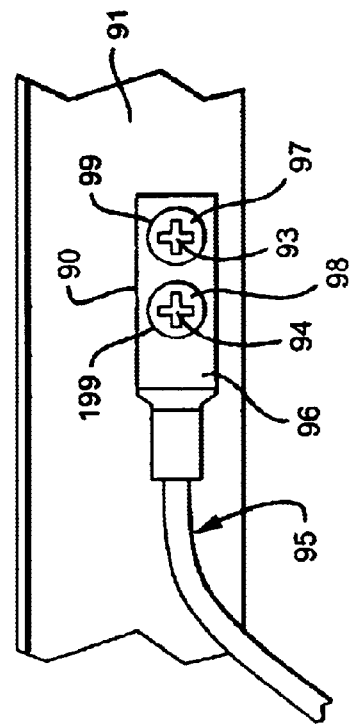
FIG. 13 is an enlarged fractional rear view of the apparatus of FIG. 1 with a ground terminal arrangement according to an embodiment of the invention.

FIG. 13 is an enlarged fractional rear view of the apparatus of FIG. 1 with a ground terminal arrangement 90 according to an embodiment of the invention, part of which is also seen in FIG. 1. In particular, FIGS. 1 and 13 show a panel structure 91 that may be part of the apparatus 10. A pair of spaced ground terminals 93 and 94, such as in the form of clenched nuts, are on that panel structure. FIG. 13 also shows a ground wiring device 95 having a lug 96 with two apertures 97 and 98 corresponding to that pair of spaced ground terminals 93 and 94 and being attached with that pair of spaced ground terminals through those two apertures to that panel structure, such as with the aid of screws 99 and 199 which cover with their heads the corresponding two apertures 97 and 98 in the ground wiring lug 96.

In practice, this prevents the ground wire terminal from turning and from thereby working itself loose over time and assures perfect grounding at all times.

FIG. 14 is a plan view of a flame-resistant designation card 70 which may be used in the apparatus of FIG. 1 or otherwise. Suitable flame-resistant materials for such designation card include polypropylene pursuant to Underwriters Laboratory Schedule 94V-0 Flame Rated, but no limitation to any specific material is intended, as long as it is flame-resistant and preferably can be printed and written on.

According to the embodiment of the invention illustrated in FIG. 14, the flame-resistant designation card 70 comprises a first data-bearing section 72, a second data-bearing section 73, a first folding crease 74 between these first and second data-bearing sections, a shorter third section 75 adjacent the second data bearing section 73, and a second folding crease 76 between that shorter third section 75 and the second data-bearing section 73.

The card 70 may bear printed matter of utility in the use of the apparatus or of utility to the use of the card itself. Further data may be written into the rows and columns of the data grid indicated in FIG. 14.

By way of example and not by way of limitation, useful data on the card 70 in the context of the apparatus of FIG. 1 include information on fuses in the two sets of fuse holders 50, including for each fuse holder 51, 52, 53, etc., the circuit which it is serving and the ampere rating of the fuse inserted or required therein. Such and other information may be provided in the first and second data-bearing sections 72 and 73. The shorter section 75 may or may not bear data. By way of example, a supplier's or manufacturer's name or designation, symbolically indicated as "MFG," may be printed on the shorter section 75.

FIG. 15 is a perspective view of the designation card 70 of FIG. 14 in a folded condition, such as usable in the apparatus of FIG. 1 or otherwise. In particular, FIG. 15 shows the card 70 after folding of the first section 72 about the first folding crease 74 onto the second data-bearing section 73, and after folding of the third data-bearing section 75 about the second folding crease 76 onto the folded first data-bearing section 72. The flame-resistant designation card 70 according to the embodiment of the invention illustrated in FIG. 15 with reference to FIG. 14, includes the first data-bearing section 72 folded about the first folding crease 74 onto the second data-bearing section 73, and the third data-bearing section 75 folded about the second folding crease 76 onto the folded first data-bearing section 72.

FIG. 1 shows an end portion of the folded card 70, the bulk of which is inserted into the apparatus 10 through a slot 77 in the cabinet 12 or panel 62. Such card 70 may have lateral card stops 78 and 79 in the vicinity of the second folding crease 76. As their name implies, such card stops 78 and 79 stop the card at the slot 77 from being pushed too far into the cabinet 12. The card 70 thus remains readily retrievable from the cabinet for review or revision of data printed or written thereon.

The flame-resistant card according to the invention is greatly superior to prior-art versions that packed data-bearing cards into an enclosure structured similarly to the card 70. At least the embodiment of the flame-resistant card as shown in FIG. 14 with information on fused circuits in fields 72 and 73 may thus in effect be part of the fuse holder structures 50 and 150 or of the alarm circuitry 67 or of other parts of the apparatus 10, such as the fused wire harness 60 or output terminals 69 and 169.

This extensive disclosure will render apparent various modifications and variations within the spirit and scope of the invention and equivalents thereof.

We claim:

1. An electrical apparatus comprising:
   a housing having a slot;
   a plurality of electrical fuse holders mounted in said housing; and
   a folded flame-resistant fuse rating designation card partially inserted into said slot from the outside of said housing, said card being fully removable from said slot and said card having lateral card stops to prevent the entirety of said card from being pushed into said housing.

2. An electric apparatus as in claim 1, including:
   said plurality of electric fuse holders mounted in mutually spaced relationship; and
   a heat sink including a frame around said plurality of mutually spaced electric fuse holders in heat-transfer relationship with said electric fuse holders, and a cross-piece between each adjacent pair of the mutually spaced electric fuse holders.

3. An electric apparatus as in claim 1, including:
   said plurality of electric fuse holders mounted above a floor;
   a plurality of electric fuses, one in each of said plurality of electric fuse holders;
   substantially each of said electric fuses having a spring-biased fuse condition flagging device pointing toward said floor in a blown condition of that electric fuse.

4. An electric apparatus as in claim 1, including:
   a plurality of designation pins, one for each fuse holder, with each of these designation pins designating a power rating attributed to a corresponding one of said electric fuse holders; and
   a plurality of apertures in said housing, one for each of said designation pins, respectively aligned with said electric fuse holders.

5. An electric apparatus as in claim 1, including:
   said plurality of electric fuse holders mounted above a floor;
   a plurality of electric fuses, one in each of said plurality of electric fuse holders;
   substantially each of said electric fuses having a spring-biased fuse condition flagging device pointing toward said floor in a blown condition of that electric fuse.

6. An electric apparatus as in claim 2, wherein:
   said heat sink has a ladder-like configuration, with rungs of said ladder-like configuration interdigitated with said electric fuse holders.

7. An electric apparatus as in claim 2, including:
   said plurality of electric fuse holders mounted in said housing in mutually spaced relationship apart from said heat sink.

8. An electrical apparatus comprising:
   a housing having a slot;
   a plurality of electric fuse holders mounted in said housing, and
   a folded flame-resistant fuse rating designation card partially inserted in said slot;
   wherein said flame-resistant fuse rating designation card comprises in combination:
      a first fuse rating data-bearing section;
      a second fuse rating data-bearing section;
      a first folding crease between said first and second fuse rating data-bearing sections;
      a shorter third section adjacent said second data bearing section; and
      a second folding crease between said shorter third section and said second fuse rating data-bearing section.

9. An apparatus as in claim 8, including:
   said first data-bearing section folded about said first folding crease onto said second data-bearing section; and
   said third data-bearing section folded about said second folding crease onto said folded first data-bearing section.

10. An electric apparatus as in claim 8, including:
    lateral card stops in a vicinity of said second folding crease.

* * * * *